(12) United States Patent
Heirich et al.

(10) Patent No.: US 6,578,972 B1
(45) Date of Patent: Jun. 17, 2003

(54) COMPUTER MONITOR BEZEL

(75) Inventors: Douglas L. Heirich, Palo Alto, CA (US); James J. Hong, Cupertino, CA (US)

(73) Assignee: Apple Computer, Inc., Cupertino, CA (US)

( * ) Notice: Subject to any disclaimer, the term of this patent is extended or adjusted under 35 U.S.C. 154(b) by 25 days.

(21) Appl. No.: 09/908,205

(22) Filed: Jul. 17, 2001

(51) Int. Cl.[7] .............................................. G02B 17/00
(52) U.S. Cl. ..................... 359/608; 359/609; 359/610; 359/611; 359/612
(58) Field of Search ................................ 359/608, 609, 359/610, 611, 612, 602, 603, 601; 348/373, 834, 825, 826; 439/92; 248/489

(56) References Cited

U.S. PATENT DOCUMENTS

| 5,448,405 | A | * | 9/1995 | Clausen et al. ............. 359/601 |
| 5,689,371 | A | * | 11/1997 | Butterfield ................... 359/609 |
| 5,803,424 | A | * | 9/1998 | Keehn et al. ................ 248/489 |
| 5,841,227 | A | * | 11/1998 | Terpin ......................... 313/479 |
| 5,909,315 | A | * | 6/1999 | Keehn .......................... 359/609 |
| 6,050,833 | A | * | 4/2000 | Danzyger et al. ............. 439/92 |
| 6,144,418 | A | * | 11/2000 | Kappel et al. .............. 348/834 |
| 6,152,567 | A | * | 11/2000 | LaForgia ..................... 359/609 |

* cited by examiner

Primary Examiner—Mohammad Sikder
(74) Attorney, Agent, or Firm—Blakely, Sokoloff, Taylor & Zafman LLP

(57) ABSTRACT

The invention provides a computer monitor bezel including a bezel mount, and opaque planar member, and a bezel face. The bezel mount includes a frame and a mounting formation. The frame defines a frame viewing opening entirely surrounded by the frame. The mounting formation is located on the frame to mount the frame to a sub-monitor in a position wherein a screen of the sub-monitor is viewable through the frame viewing opening. The opaque planar member is located over the bezel mount. The bezel face includes a translucent planar member and an attachment component. The translucent planar member is located over the opaque planar member. The attachment component has a first end secured to the translucent planar member, extends past a plane of the opaque planar member, and has a second, opposing end secured to the frame.

18 Claims, 3 Drawing Sheets

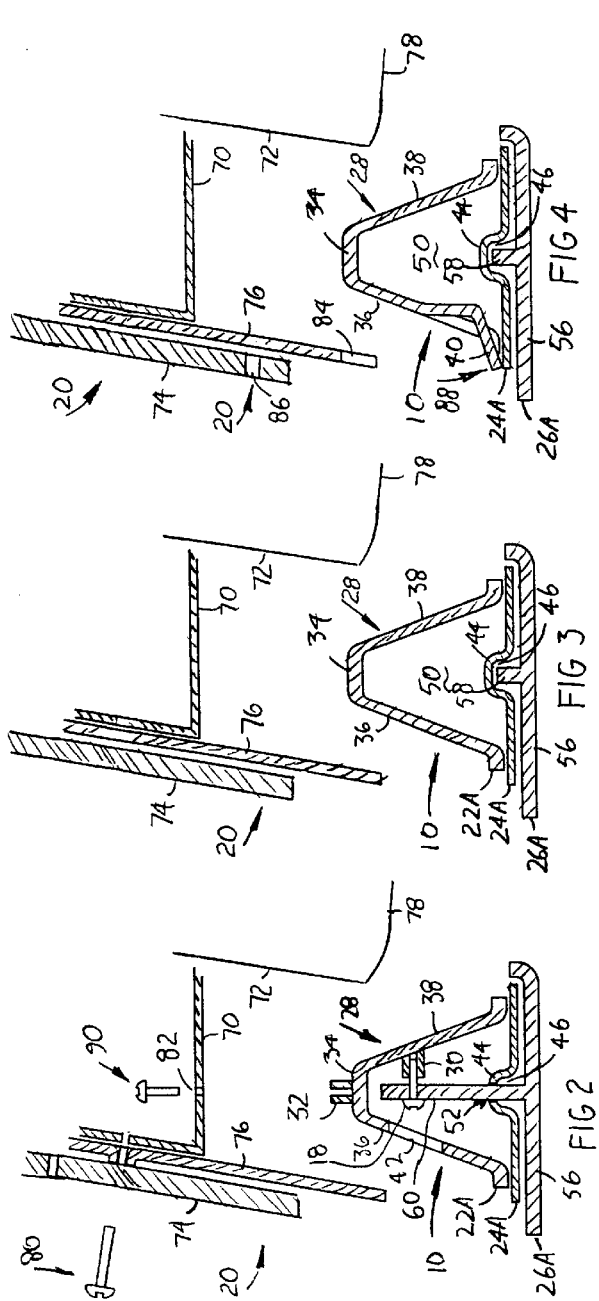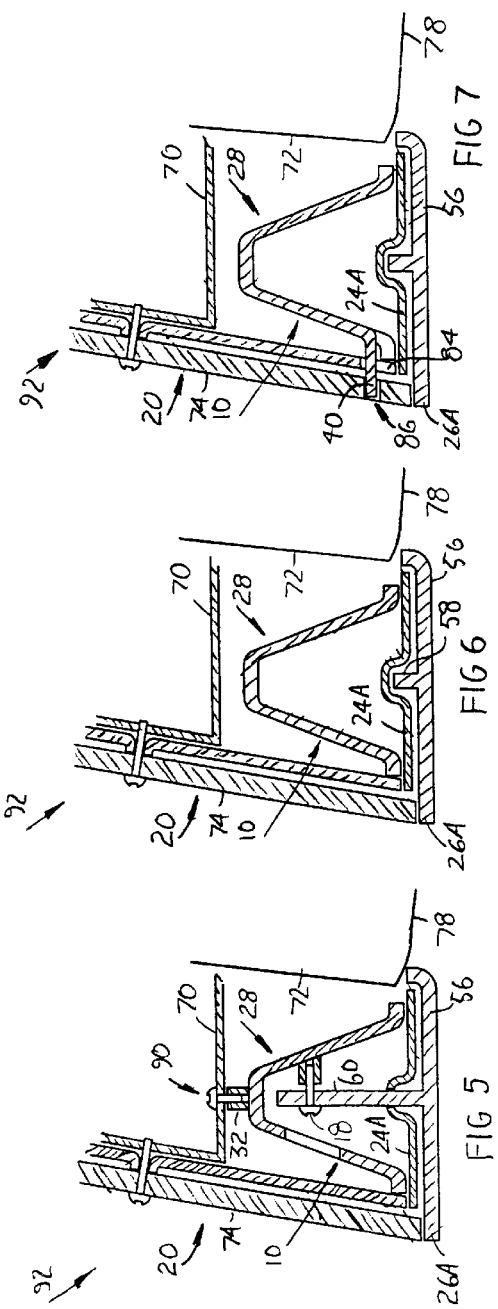

COMPUTER MONITOR BEZEL

BACKGROUND OF THE INVENTION

1). Field of the Invention

This invention relates to a computer monitor and more particularly to its bezel.

2). Discussion of Related Art

A computer monitor usually has a cathode ray tube (CRT), a case housing, and a bezel. The CRT has a forward facing screen on which a two-dimensional picture can be displayed. The case housing is located over left, upper and right sides of the CRT.

The bezel is generally a planar member having a central viewing opening which is entirely surrounded by the bezel. The viewing opening is located over the screen so that it surrounds the screen and partially overlaps edges of the screen. The bezel is then mounted to the frame or to the CRT. A person located in front of the monitor can view the picture on the screen of the CRT through the opening in the bezel.

Traditionally, bezels have been made of opaque materials. More recently, it has become desirable to have bezels made of translucent or transparent materials for cosmetic purposes. Ideally, a person should not be able to view too many bezel components such as components which are used for structural support or components which are used for mounting the bezel to either the frame or the CRT even though the bezel is translucent or transparent.

SUMMARY OF THE INVENTION

The invention provides a computer monitor bezel including a bezel mount, and opaque planar member, and a bezel face. The bezel mount includes a frame and a mounting formation. The frame defines a frame viewing opening entirely surrounded by the frame. The mounting formation is located on the frame to mount the frame to a sub-monitor in a position wherein a screen of the sub-monitor is viewable through the frame viewing opening. The opaque planar member is located over the bezel mount. The bezel face includes a translucent planar member and an attachment component. The translucent planar member is located over the opaque planar member. The attachment component has a first end secured to the translucent planar member, extends past a plane of the opaque planar member, and has a second, opposing end secured to the frame.

BRIEF DESCRIPTION OF THE DRAWINGS

The invention is further described by way of example with reference to the accompanying drawings wherein:

FIG. 2 is a cross-sectional plan view on 2—2 in FIG. 1 after the computer monitor bezel is assembled, further illustrating components of a computer sub-monitor;

FIG. 3 is a cross-sectional plan view on 3—3 in FIG. 1;

FIG. 4 is a cross-sectional plan view on 4—4 in FIG. 1;

FIG. 5 is a view similar to FIG. 2 after the computer monitor bezel is mounted to a steel frame of the sub-monitor;

FIG. 6 is a view similar to FIG. 3 after the computer monitor bezel is mounted to the steel frame;

FIG. 7 is a view similar to FIG. 4 after the computer monitor bezel is mounted to the steel frame.

DETAILED DESCRIPTION OF THE INVENTION

Figure 1:
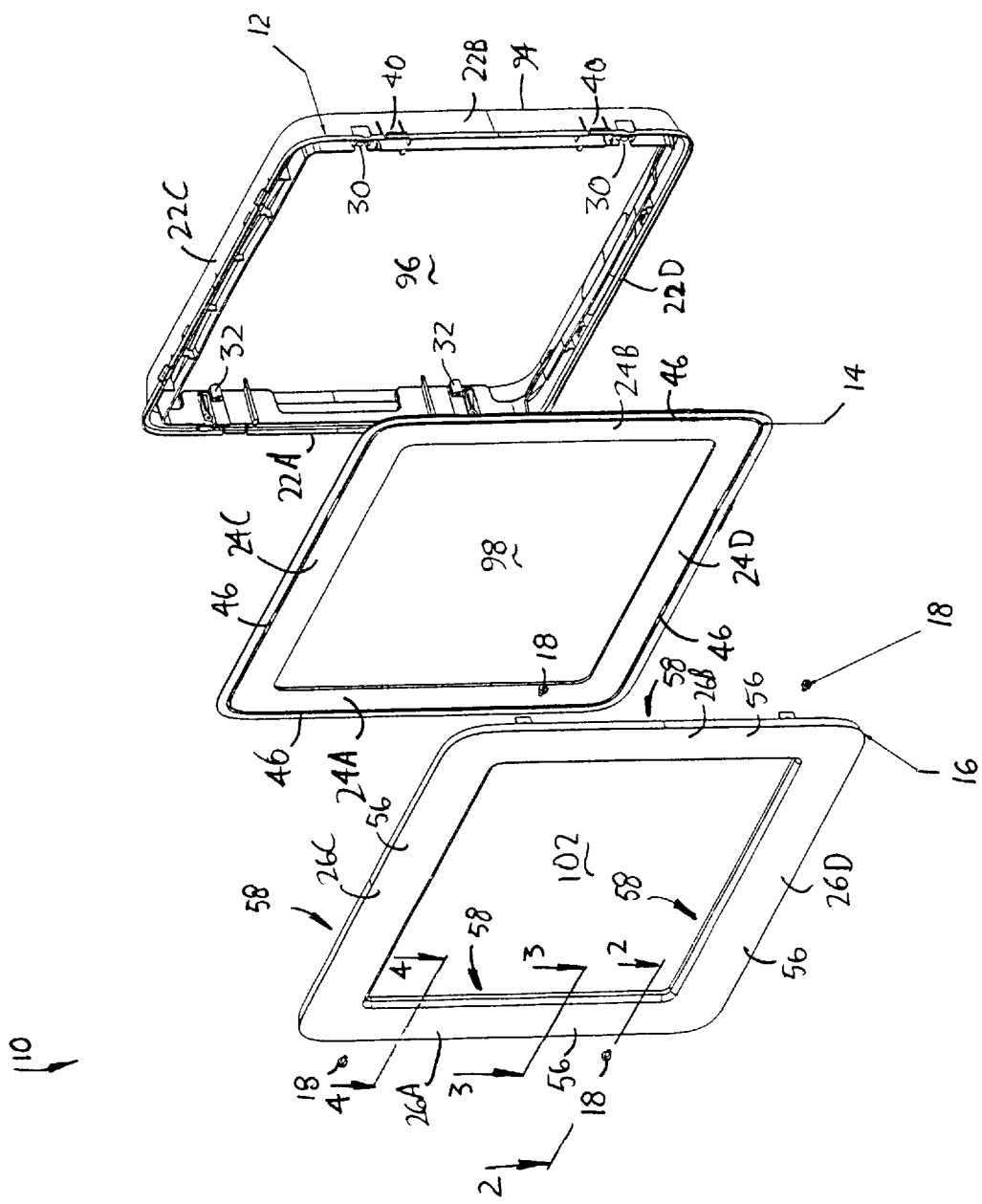
FIG. 1 is an exploded perspective view of components of a computer monitor bezel according to the invention.

FIG. 1 of the accompanying drawings illustrates a computer monitor bezel according to an embodiment of the invention including a structure-providing bezel mount 12, a sight-limiting opaque planar member 14, an outer bezel face 16, and bezel face fastening screws 18.

The bezel mount 12 and the opaque planar member 14 are both molded from opaque materials through which light does not transmit. The bezel face 16 is molded from a translucent material. The translucent material of the bezel face 16 allows light through and allows for objects to be seen when located behind the bezel face 16. Objects located at a distance behind the bezel face 16 can generally not be seen in great detail. It should be noted that the terms "opaque" and "translucent" are used loosely herein. It may for example be possible that the planar member 14 be made of a "cloudy" material and the bezel face 16 be made of a totally transparent material and still be within the scope of the invention. What is important is to compare the degree to which light transmits through the planar member 14 to. the degree to which light transmits through the bezel face 16. The material of the bezel face 16 allows light through and the material of the planar member 14 serves to attenuate transmission of light.

FIGS. 2, 3, and 4 illustrate the computer monitor bezel 10 on 2—2, 3—3, and 4—4 in FIG. 1 after they are assembled and further illustrates a partially assembled sub-monitor 20 before the bezel 10 is mounted thereto. The sections 22, 3—3, and 4—4 are at different heights through left limbs 22A, 24A; and 26A of the bezel mount 12, the opaque planar member 14, and the bezel face 16, respectively, and through a left portion of the components of the sub-monitor 20.

The limb 22A of the bezel mount 12 includes a frame portion 28, a boss 30 for securing the limb 26A of the bezel face 16 thereto, and a boss 32 to mount the frame portion 28 to the sub-monitor 20.

The frame portion 28 includes a back portion 34, an outer side portion 36, and an inner side portion 38 which jointly define a channel having a mouth facing away from the sub-monitor 20. The boss 30 is secured to an inner surface of the inner side portion 38. The boss 32 is secured to an outer surface of the back portion 34. A spring clip 40 is formed out of a region of the outer side portion 36. The spring clip 40 can be bent into a remainder of the outer side portion 36 and will return under spring action to its original position. An access opening 42 is formed in the outer side portion 36. The bosses 30 and 32 and the access opening 42 are all located in the plane 2—2 of FIG. 1 and the spring clip 40 is located in the plane 4—4 of FIG. 1.

The left limb 24A of the opaque planar member 14 has a recessed formation 44 formed longitudinally therein. The recessed formation 44 forms a groove 46 longitudinally along the limb 24A into the paper. The limb 24A is located over the mouth of the frame portion 28. An enclosure 50 is thereby formed jointly by the limb 24A and the frame portion 28 with the groove 46 located on the outside of the enclosure 50.

An attachment opening 52 is formed through the recessed formation 44. The attachment opening 52 is located in the plane 2—2 shown in FIG. 1. The attachment opening 52 is relatively narrow in a plane of the paper and relatively wide into the paper.

The left limb 26A of the bezel face 16 includes a translucent planar member portion 56, a ridge 58, and an attachment component 60. The ridge 58 extends from a rear surface of the translucent planar member portion 56. The ridge 58 has a length that extends along the length of the translucent planar member portion 56 into the paper. The attachment component 60 extends from a portion of the ridge 58. The attachment component 60 has a thickness in a plane of the paper which corresponds substantially with a thickness of the ridge 58, and a width into the paper which is typically about three or four times its thickness.

The translucent planar member portion 56 is located over the left limb 24A of the opaque planar member 14 with the ridge 58 located in the groove 46. The attachment component 60 is inserted through the attachment opening 52 into the enclosure 50. The attachment component 60 thus has first and second ends on opposing sides of a plane of the opaque planar member 14.

A threaded fastener attachment opening is form ed in the boss 30. A fastener opening is also formed in the attachment component 60. The fastener openings are brought into alignment and one of the bezel face fastening screws 18 is then inserted through the access opening 42. The bezel fastening screw 18 has a shaft which is first inserted through the fastener opening in the attachment component 60 and then screwed into the threaded fastener component in the boss 30. The screw 18 secures the attachment component 60 to the boss 30 and hence the left limb 26A of the bezel face 16 to the left limb 22A of the bezel mount 12.

The sub-monitor 20 includes a steel frame 70, a picture generating device in the form of a CRT 72, a translucent case housing 74, and an opaque shroud 76.

The CRT 72 is mounted to the steel frame 70 and has a front screen 78. A two-dimensional picture can be generated and be displayed on the screen 78. A bezel screw hole 82 is formed in the steel housing 70. A slot 84 is formed in a front edge of the opaque shroud 76. A clip retaining opening 86 is formed in the translucent case housing 74 near a front edge thereof. The bezel screw hole 82 is located in the plane 2—2 of FIG. 1. Of more importance is that the slot 84 and clip retaining opening 86 are in the plane 4—4 in FIG. 1.

FIGS. 5, 6, and 7 illustrate the sub-monitor 20 and the computer monitor bezel 10 after being engaged with one another. The computer monitor bezel 10 is moved back into engagement with the steel frame 20.

A bezel mounting screw 90 is inserted through the bezel screw hole 82 and turned into a threaded opening in the boss 32. An inner edge of the translucent planar member portion 56 is then positioned slightly over an outer edge of the screen 78.

The opaque shroud 76 is located over the steel frame 70 and the CRT 72. The case housing 74 is then located over the shroud 76. The spring clip 40 is deflected in a direction 88 by the front edge of the translucent case housing 74. When the translucent case housing 74 is moved further forward, the spring clip 40 slides into the slot 84 and a tip of the spring clip 40 becomes aligned with the clip retaining opening 86. The spring clip 40 then moves under spring action in a direction opposite to the direction 88 so that a tip of the spring clip 40 moves into the clip retaining opening 86. The translucent case housing 74 is so aligned with and secured to the bezel 10 and the sub-monitor 20.

A housing mount screw 80 is inserted through openings in the translucent case housing 74, the opaque shroud 76, and the steel frame 70. The housing mount screw 80 thus secures the translucent case housing 74 and the opaque shroud 76 to the steel frame 70, in addition to the spring clip 40.

Figure 8:
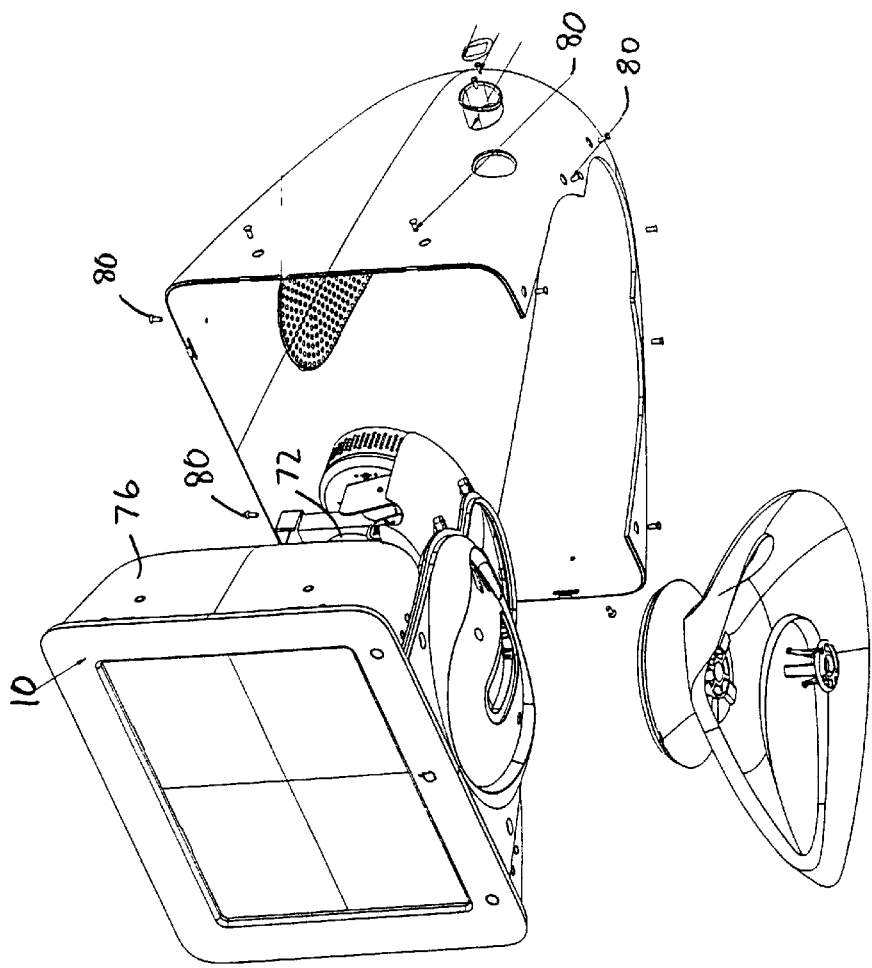
FIG. 8 is a perspective view of a computer monitor before a case housing is mounted.

As shown in FIG. 8, the case housing 74 is located on the left, the right, and above the CRT 72. More screws 80 are located through portions of the shell 74 above and on sides of the CRT 72.

The completed construction of the sub-monitor 20 and the computer monitor bezel 10 finalizes the construction of a computer monitor 92.

Referring again to FIG. 5, a person is positioned in front (at the bottom in FIG. 5) of the computer monitor 92. The person can view a picture displayed on the screen 78 from such a location. The person can also see the translucent planar member 56 from such a position. Although the translucent planar member portion 56 is translucent, the left limb 24A of the opaque planar member 14 obscures components located behind it, for example all the components of the bezel mount 12 and the screw 18. The only component behind the translucent planar member portion 56 which is viewable by the person is a line formed by the ridge 58. Such a line can easily be disguised by forming parallel grooves or lines on a front surface of the translucent planar member portion 56.

Referring again to FIG. 1, the bezel mount 12 includes, in addition to the left limb 22A also a right limb 22B and upper limb 22C, and a lower limb 22D. Two bosses (not shown) are formed on the left limb 22A and two spring clips (not shown) are formed on the left limb 22A. The right limb 22B is a mirror image of the left limb 22A and thus also includes a frame portion, two bosses 30 and two spring clips 40. The bezel face 16 is thus securable at two locations on the left limb 22A and two locations on the right limb 22B and the bezel mount 12 is securable to the sub-monitor 20 at two locations on the left limb 22A and two locations on the right limb 22B.

The upper and lower limbs 22C and 22D each include only a respective frame portion. The frame portions of the limbs 22A–D are connected to one another to form a rectangular frame 94. A rectangular frame viewing opening 96 is defined within the frame 94. The frame viewing opening 96 is entirely surrounded by the frame 94. There is thus no discontinuity in the frame 94 surrounding the frame viewing opening 96 which may weaken the frame 94. The frame 94 provides sufficient rigidity because it entirely surrounds the frame viewing opening 96 and because of its channel shape. The frame viewing opening 96 is defined by a right edge of the left limb 22A, a left edge of the right limb 22B, a lower edge of the upper limb 22C, and an upper edge of the lower limb 22D.

The opaque planar member 14, in addition to the left limb 24A also includes a right limb 24B, an upper limb 24C, and a lower limb 24D. The limbs 24A–D are formed into a rectangle defining an opaque member viewing area 98. The opaque member viewing area 98 is defined by right, left, lower and upper edges of the limbs 24A–D, respectively. The opaque member viewing opening 98 is entirely surrounded by the opaque planar member 14. A respective groove 46 is formed in each one of the limbs 24A–D. The groove 46 of the left limb 24A leads directly into the groove 46 of the upper limb 24C. The other grooves 46 lead off one another in a similar manner to form an unbroken groove around the planar member viewing opening 98.

In a similar manner, the bezel face 16, in addition to the left limb 26A, also includes a right limb 26B, an upper limb 26C, and a lower limb 26D. Each limb 26A–D has a respective translucent planar member portion 56, and a respective ridge 58 behind it.

The translucent planar member portions 56 of the limbs 26A–D are formed into a rectangle which entirely surrounds a translucent member viewing opening 102. The translucent member viewing opening 102 is defined by right, left, lower, and upper edges of the translucent planar member portions 56 of the limbs 26A–D, respectively. The portions 56 combine to form a translucent planar member that entirely surrounds the translucent planar member viewing opening 102.

The ridges 58 lead off one another to form an unbroken ridge around the translucent member viewing opening 102. The unbroken ridge is located within the unbroken groove in the opaque planar member 14.

When the components of the computer monitor bezel 10 are mounted to one another, the limbs 24A–D are located over the limbs 22A–D, respectively and the limbs 26A–D are located over the limbs 24A–D, respectively. The openings 96, 98 and 102 are also in register with one another and located over the screen 78. The viewer can then view a two-dimensional picture on the screen 78 through the openings 102, 98, and 96. Respective edges of the translucent planar member portions 56 slightly overlap respective edges of the screen 78.

It can thus be seen that a computer monitor bezel 10 is constructed which has sufficient rigidity before being mounted to the steel frame 20. The rigidity of the computer monitor bezel 10 is provided by the bezel mount 12 and its construction. The computer monitor bezel 10 has a translucent bezel face 16 for cosmetic appeal. Although the bezel face 16 is translucent, the bezel mount 12 cannot be seen because it is located behind the opaque planar member 14 and thus out of sight of a person viewing a picture on the screen 78.

While certain exemplary embodiments have been described and shown in the accompanying drawings, it is to be understood that such embodiments are merely illustrative and not restrictive of the current invention, and that this invention is not restricted to the specific constructions and arrangements shown and described since modifications may occur to those ordinarily skilled in the art.

What is claimed:

1. A computer monitor bezel comprising:
   a bezel mount including a frame defining a frame viewing opening entirely surrounded by the frame, and a mounting formation on the frame to mount the frame to a component of a sub-monitor in a position wherein a screen of the sub-monitor is viewable through the frame viewing opening;
   an opaque planar member located over the bezel mount; and
   a bezel face including a translucent planar member located over the opaque planar member and an attachment component having a first end secured to the translucent planar member, extending past a plane of the opaque planar member and having a second, opposing end secured to the frame.

2. The computer monitor bezel of claim 1 wherein the frame has a limb with a channel-shaped cross-sectional profile.

3. The computer monitor bezel of claim 1 wherein the frame viewing opening is substantially rectangular.

4. The computer monitor bezel of claim 3 wherein the frame has a lower member with an upper edge defining a lower edge of the frame viewing opening.

5. The computer monitor bezel of claim 1 wherein the bezel mount includes a boss on the frame having a fastener opening therein and the attachment component has a fastener opening therein, the fastener openings being aligned with one another, further comprising:
   a fastener having a shaft that is inserted through the fastener openings.

6. The computer monitor bezel of claim 5 wherein the opaque planar member and the translucent planar member are located over the fastener as viewed from a location of a person viewing the screen.

7. The computer monitor bezel of claim 5 wherein the frame defines an access opening through which the shaft is insertable into the fastener openings.

8. The computer monitor bezel of claim 1 wherein the mounting formation is a boss having an opening into which a fastener is insertable.

9. The computer monitor bezel of claim 1 wherein the opaque planar member defines an opaque member viewing area, entirely surrounded by the opaque planar member, through which the screen is viewable.

10. The computer monitor bezel of claim 1 wherein the opaque planar member defines an attachment opening through which the attachment component extends from the first end to the second end thereof.

11. The computer monitor bezel of claim 1 wherein the translucent planar member defines a translucent member viewing opening, entirely surrounded by the translucent planar member, through which the screen can be viewed.

12. The computer monitor bezel of claim 11 wherein the bezel includes a ridge extending substantially parallel to inner and outer edges of the translucent member viewing opening the attachment component extending from the ridge.

13. The computer monitor of claim 12 wherein the ridge entirely surrounds the translucent member viewing opening.

14. The computer monitor of claim 12 wherein the attachment component has a thickness which is no wider than a thickness of the ridge, measured in the same direction.

15. The computer monitor of claim 14 wherein the attachment component has a width which is larger than its thickness.

16. A computer monitor comprising:
    a picture generating device having a screen for displaying a picture to be viewed by a person facing the screen;
    a case housing above and adjacent left and right sides of the picture generating device to form a sub-monitor;
    a bezel mount mounted to the sub-monitor and including a frame viewing opening entirely surrounded by the frame and located so that the person can view the screen through the frame viewing opening;
    an opaque planar member located over the bezel mount; and
    a bezel face including a translucent planar member located over the opaque planar member and an attachment component having a first end secured to the translucent planar member, extending past a plane of the opaque planar member and having a second, opposing end secured to the frame.

17. The computer monitor of claim 16 wherein the opaque planar member defines an opaque member viewing area, entirely surrounded by the opaque planar member, through which the screen is viewable.

18. The computer monitor of claim 17 wherein the translucent planar member defines a translucent member viewing opening, entirely surrounded by the translucent planar member, through which the screen can be viewed.

* * * * *